(12) United States Patent
Chen

(10) Patent No.: US 6,523,039 B1
(45) Date of Patent: Feb. 18, 2003

(54) FORTUNE-TELLING ORIENTED NETWORK INFORMATION SUPPLY SYSTEM AND METHOD

(75) Inventor: Chih-Min Chen, Taipei (TW)

(73) Assignee: Yi-Fu Lin, Taipei (TW)

( * ) Notice: Subject to any disclaimer, the term of this patent is extended or adjusted under 35 U.S.C. 154(b) by 323 days.

(21) Appl. No.: 09/688,217

(22) Filed: Oct. 16, 2000

(30) Foreign Application Priority Data

May 5, 2000 (TW) .......................................... 89108570

(51) Int. Cl.$^7$ .............................................. G06F 17/30
(52) U.S. Cl. ...................................... 707/100; 707/104
(58) Field of Search ................................ 707/100, 104; 382/118; 434/106; 701/207; 446/397

(56) References Cited

U.S. PATENT DOCUMENTS

| | | | |
|---|---|---|---|
| 4,304,554 A | * 12/1981 | Slayden ...................... | 434/106 |
| 5,479,529 A | * 12/1995 | Nakagawa et al. ......... | 382/118 |
| 5,516,289 A | * 5/1996 | Quigley et al. ............. | 434/106 |
| 6,330,566 B1 | * 12/2001 | Durham .................... | 707/104.1 |
| 6,368,176 B1 | * 4/2002 | Lozowski et al. .......... | 446/397 |
| 6,470,264 B2 | * 10/2002 | Bide .......................... | 701/207 |

* cited by examiner

Primary Examiner—Sanjiv Shah
(74) Attorney, Agent, or Firm—Birch, Stewart, Kolasch & Birch, LLP

(57) ABSTRACT

A fortune-telling oriented network information supply system comprising a database subsystem and a fortune analysis subsystem, and coupling to an information supply device for providing the user information. The database subsystem stores relevant data on the user to perform fortune-telling activities, which are carried out in the fortune analysis subsystem. The fortune analysis subsystem generates a first request signal according to the relevant data in the database subsystem or generates a second request signal according to the fortune analysis results and sends the first request signal or the second request signal to the information supply device, which then sends the first request signal or the second request signal to the user. The invention also discloses a fortune-telling oriented network information supply method.

19 Claims, 4 Drawing Sheets

FORTUNE-TELLING ORIENTED NETWORK INFORMATION SUPPLY SYSTEM AND METHOD

BACKGROUND OF THE INVENTION

1. Field of Invention

The invention relates to a system and method for providing information on a network and, in particular, to a fortune-telling oriented system and a method for providing information over the network.

2. Related Art

In the transmission of information, the Internet has the advantages of speed, large capacity and low cost. Along with the improvement in networking, the exchange of information has become more convenient. However, transmitting information over the Internet also suffers from a flaw: it is difficult to send information according to an individual user's needs and thus wastes time and bandwidth. Therefore, how to effectively transmit information over the Internet is an urgent and important subject.

For example, in conventional information transmission technology, the usual method is to induce the consumer to "click" on advertisements by awarding "points" or cash. Although such award methods can increase the frequency of "clicks" on the advertisement, it still does not solve the problem of presenting the advertisements to those who are in need the information. In other words, most consumers click on the advertisements for the points or the cash-back offer rather than for the products shown in the advertisements. Therefore, this method cannot effectively convey the advertisement's information to the consumers.

Another conventional information transmission technology is as follows: when the user connects to a website, the website will ask the user to register his basic information, such as gender, age, profession, address and interests. The website system determines what information may be of interest to the user according to such basic information. For example, if the user is a juvenile who is interested in computers he may be interested in computer games and the website then provides this user information about computer games. This method can more precisely obtain the network user's information; nevertheless, it has the following disadvantages:

First, users often register using false information because the Internet has a problem protecting privacy. For example, an 18-year-old female may register as a 40-year-old male on the website. In this circumstance, the system cannot provide the user with the correct information.

Furthermore, this method cannot dynamically trace the interests or needs of the user. That is, if the user changes his interests with time, and does not actively modify his profile, then the information provider is unable to dynamically adjust the information content provided to the user. This will greatly lower the efficiency of the information supply. For example, if a user is a student and interested in making friends when he registers, his interests may turn to the job market when he is close to graduation. Or, the user may want to learn about. investment information today, but need travel information a week later. In this circumstance, the information provider would not know the actual needs of the user at that specific time. Thus, it cannot provide the correct information to the user.

Therefore, many problems still exist within the conventional network information supply method and it cannot provide the user with the correct information he needs. How to more accurately understand the user's needs and obtain his information so as to effectively provide information over the network has become an important issue to be solved.

SUMMARY OF THE INVENTION

In view of the foregoing, it is an object of the invention to provide a fortune-telling oriented network information supply system and method which can induce users to register real information so that the information provider can more accurately and effectively provide the information the users need.

It is another object of the disclosed invention to provide a fortune-telling oriented network information supply system and method which can dynamically understand the user's interests and needs so that the information provider can more accurately and effectively provide the information the users need.

To achieve the above objectives, the fortune-telling oriented network information supply system of the invention is coupled with an information supply device for providing the user's information and comprises a database subsystem and a fortune analysis subsystem. The database subsystem stores the relevant information of the user to perform a fortune analysis and the fortune analysis subsystem allows the user to analyze his fortune. The fortune analysis subsystem generates a first request signal according to the relevant data in the database subsystem or generates a second request signal according to the fortune analysis results and sends the first request signal or the second request signal to the information supply device, which then sends information to the user according to the first request signal or the second request signal.

Another embodiment of the invention is a fortune-telling oriented network information supply method, which is implemented in a fortune-telling oriented network information supply system so as to provide the user with information from an information supply device. The fortune-telling oriented network information supply system comprises a database subsystem for storing the relevant information of the user to perform fortune analysis and a fortune analysis subsystem for the user to analyze his fortune. The fortune-telling oriented network information supply method comprises a request signal generating procedure and a transmission procedure wherein the fortune analysis subsystem generates a first request signal according to the data stored in the database or generates a second request signal according to the fortune analysis result in the request signal generating procedure; the first request signal or the second request signal is transmitted to the information provider's server, which further transmits the information to the user according to the first or second request signal.

The fortune-telling oriented network information supply system is mainly for fortune analysis and therefore can induce the user to register real information for the information provider to more accurately and effectively provide the information the user needs.

Because the fortune-telling oriented network information supply system has the database subsystem to store the relevant information for the user to perform fortune analysis and to dynamically understand the user's interests and needs, the information provider can more accurately and effectively provide the information the user needs.

BRIEF DESCRIPTION OF THE DRAWINGS

The invention will be described with reference to the accompanying drawings.

In the various drawings, the same references relate to the same elements.

DETAILED DESCRIPTION OF THE INVENTION

Further preferred embodiments of the fortune-telling oriented network information supply system and method of the disclosed invention are described hereinafter and better understood by referring to the accompanying drawings, wherein the same references relate to the same elements.

Figure 1:
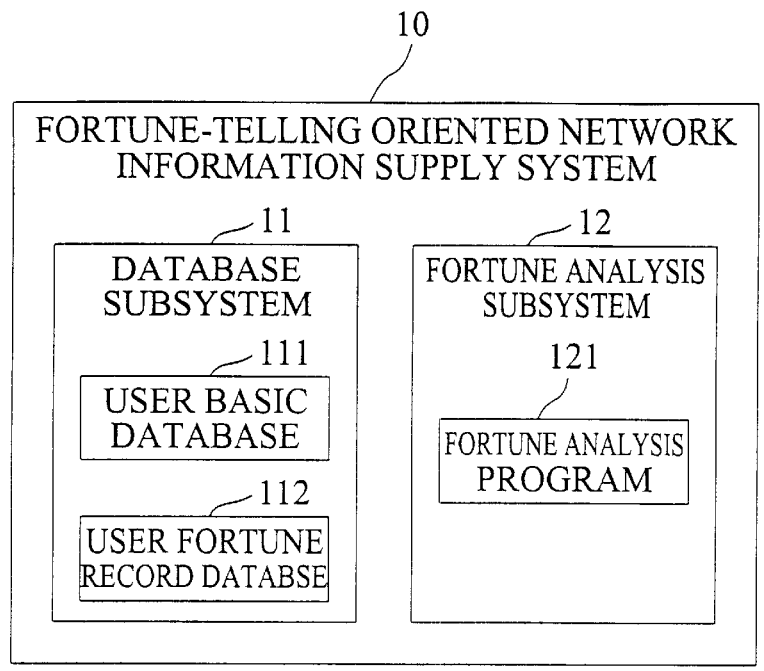
FIG. 1 is a schematic view showing the structure of the fortune-telling oriented network information supply system according to a preferred embodiment of the invention.

FIG. 1 is a schematic view showing that the fortune-telling network information supply system 10 in a preferred embodiment of the invention comprises a database subsystem 11 and a fortune analysis subsystem 12. The database subsystem 11 storing the relevant information of the user for performing a fortune analysis comprises a basic user database 111 and a user fortune record database 112; whereas the fortune analysis subsystem 12 stores a fortune analysis program 121. The basic user database 111, the user fortune record database 112 and the fortune analysis program 121 can be stored in a recording media such as RAM, hard disk drive (HDD), CD-ROM, etc. Furthermore, the basic user database 111, the user fortune record database 112 and the fortune analysis program 121 can be connected in various ways. For example, the basic user database 111, the user fortune record database 112 and the fortune analysis program 121 can be stored on the same device or different devices in accordance with practical needs.

Figure 2:
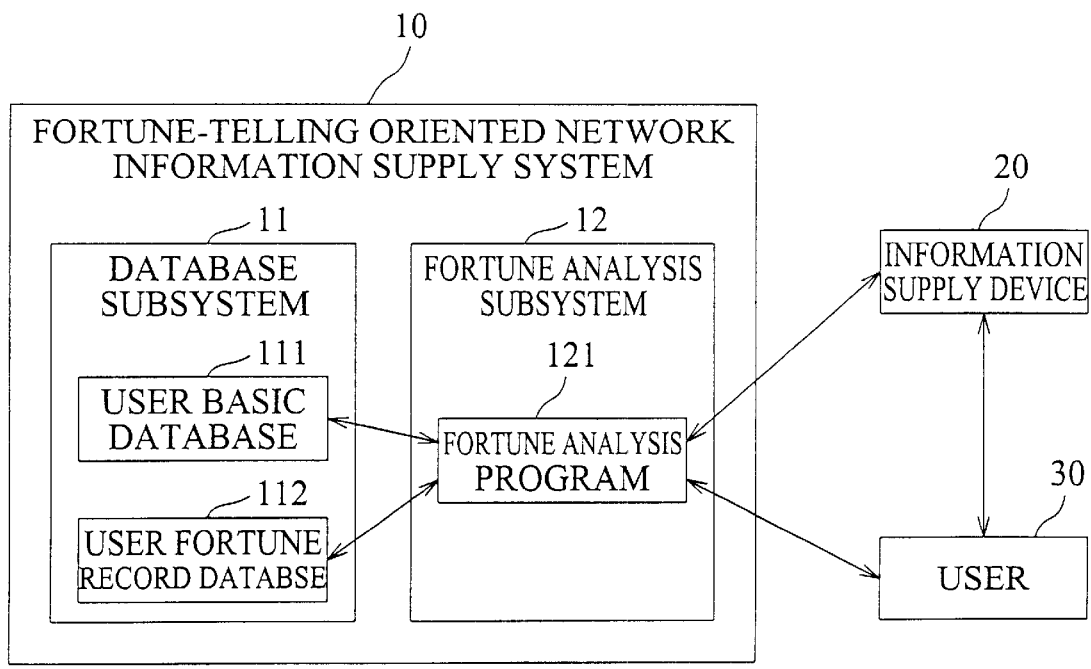
FIG. 2 is a schematic view showing an interconnection between the fortune-telling oriented network information supply system and other devices according to a preferred embodiment of the invention.

FIG. 2 is a schematic view showing the connection between the fortune-telling oriented network information supply system 10 and other devices in a preferred embodiment of the invention. In this embodiment, the fortune-telling oriented network information supply system 10 couples with an information supply device 20 for sending information to a user 30. In FIG. 2, the fortune-telling oriented network information supply system 10, the information supply device 20 and the user 30 can interconnect in various ways such as through the Internet, a local network or through wireless transmission. The fortune-telling oriented network information supply system 10 and the information supply device 20 can be located within the same device for use by the user 30.

In the fortune-telling oriented network information supply system 10, the basic user database 111 stores the basic data of the user, including name, gender, age, address, etc. The user fortune record database 112 stores the content or process of the fortune analysis program 121 performed by the user 30 such as the type or result of the fortune-telling activity. The fortune analysis program 121 comprises at least the following two functions: one is that the user 30 can perform at least one type of fortune analysis, e.g., astrology, one-day or one-week fortune-telling, etc. The other is that the system can analyze the user's request and send the corresponding information to the information supply device 20 using the relevant information stored in the database subsystem or the fortune analysis result.

The fortune-telling oriented network information system 10 can obtain information on the user 30 in at least the following two ways. First, when the user 30 logs onto the fortunetelling oriented network information system 10, the system 10 will ask the user 30 whether he would like to register his basic information. If the user 30 agrees, the system 10 then starts to inquire about the user's basic data such as age, gender and interests, and stores them in the basic user database 111. The second method is that when the user 30 executes the fortune analysis program 121 to perform fortune analysis, the system 10 will ask the user 20 the basic data needed for carrying out the fortune analysis and store them in the basic user database 111. For instance, when the system 10 performs a one-week fortune analysis using a horoscope, the user's birthday is necessary. The system can then store the user's birthday in the basic user database 111.

Once the user 30 registers his basic data, it can be retrieved directly from the basic user database 111 without again asking the user 30 for information required to run the fortune analysis; program 121. This can reduce the time needed to run the fortune analysis program 121. If the user 30 does not register his basic information, he will need to input the data every time he logs onto the fortune-telling oriented network information supply system 10 and runs the fortune analysis program 121. This would be very inconvenient for the user.

When the user 30 runs the fortune analysis program 121 to analyze his fortune, the user's fortune record database 112 stores the content and process of performing such a fortune-telling activity. For example, if the fortune analysis program 121 provides the user 30 with his fortunes regarding wealth and love, then the user fortune record database 112 can store information such as the logon times, length of logon, the time required to perform the analysis and the results of the analysis over the past week. According to a preferred embodiment of the fortune-telling oriented network information supply system 10 of the disclosed invention, the fortune analysis program 121 can analyze which information may interest the user 30 according to the data in the basic user database 111, the data in the user fortune record database 112 or the user's previous results from the fortune analysis program 121. The system 10 further sends out a request signal to the information supply device 20 so that the information supply device 20 can transmit to the user 30 the information he may need in the form of files, texts, images or sound. Moreover, the fortune analysis program 121 can store the information types received by the user to the user fortune record database 112.

Figure 3:
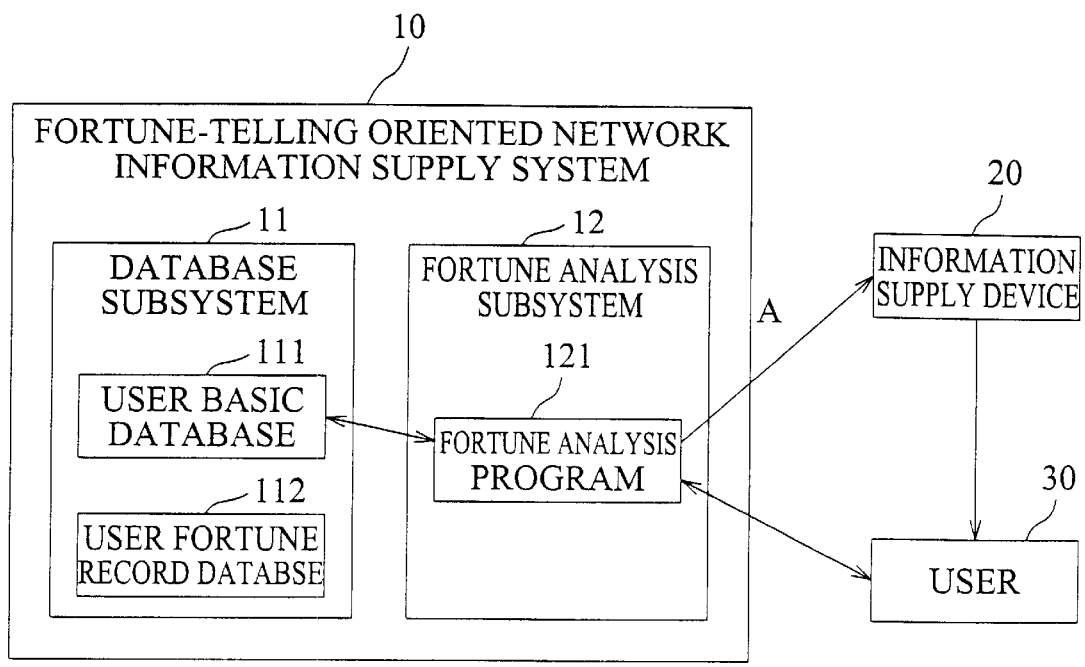
FIG. 3 is a schematic view showing the process of generating a first request signal in a preferred embodiment of the fortune-telling oriented network information supply system.

With reference to FIG. 3, when the user 30 logs onto the fortune-telling oriented network information supply system 10, the fortune analysis program 121 judges which information may interest the user 30 according to the data in the basic user database 111. For example, if the user 30 is registered in the basic user database 111 as a male who is aged between 15 and 25 and loves sports, it may be judged that he is interested in professional basketball news, sports discussions, or sports shoes advertisements. Therefore, the fortune analysis program 121 sends out a first request signal A regarding such information to the information supply device 20, which then searches for relevant information according to the first request signal A and sends it to the user 30.

If the user 30 is not registered in the user basic database 111, the system 10 can provide default setting information to the user 30 and ask the user 30 whether he would like to register basic data to become a member of the system 10. As previously described, if the user 30 is registered as a member, the system can directly retrieve the user information from the basic user database 111 so as to reduce the user's time in running the fortune analysis program 121. The system can also use other promotions to attract more users 30 to register as members.

Figure 4:
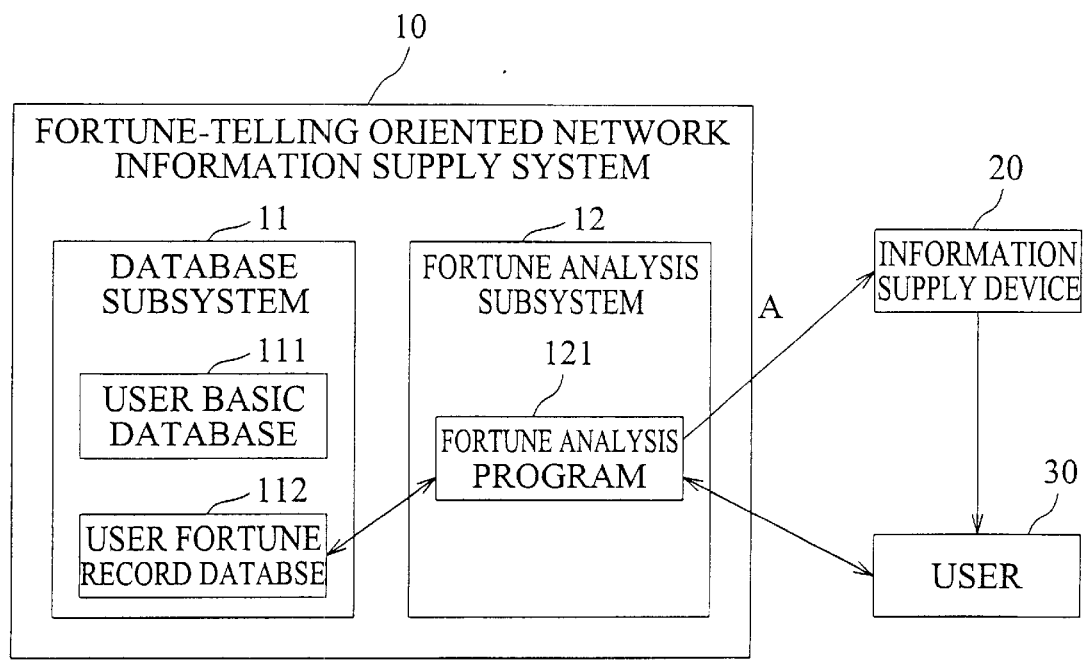
FIG. 4 is a schematic view showing the process of generating another first request signal in a preferred embodiment of the fortune-telling oriented network information supply system.

Referring to FIG. 4, when the user 30 logons to the disclosed fortune-telling oriented information supply system 10 and runs the fortune analysis program 121, the user fortune record database 112 can record the content or process. The fortune analysis program 121 can generate a first request signal A according to the content in the user record database 112. For example, if the system 10 learns from the user fortune record database 112 that the user 30 was particularly interested in whether he would have good fortune regarding wealth when running the fortune analysis program 121 in the past couple of days, it is likely that the user 30 may need investment related information. The fortune analysis program 121 can then send out a first request signal A regarding stock market or financial news to the information supply device 20. After receiving the first request signal A, the information supply device 20 can send the relevant stock or financial news to the user 30.

Figure 5:
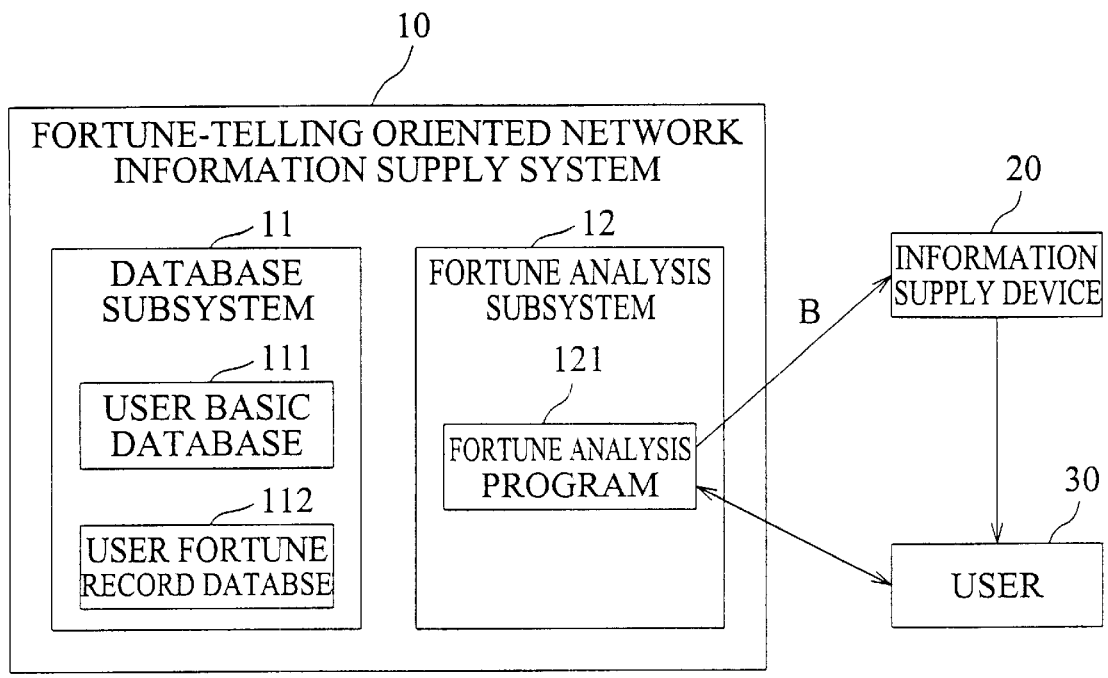
FIG. 5 is a schematic view showing the process of generating a second request signal in a preferred embodiment of the fortune-telling oriented network information supply system.

With reference to FIG. 5, the fortune analysis program 121 can further determine which information may interest the user 30 according to the results of the fortune analysis program 121 and send a second request signal B to the information supply device 20. For example, if the results of the fortune analysis program 121 suggest that the user 30 traveled this week, the fortune analysis program 121 can send a second request signal B to the information supply device 20 which will then send travel information to the user 30.

Figure 6:
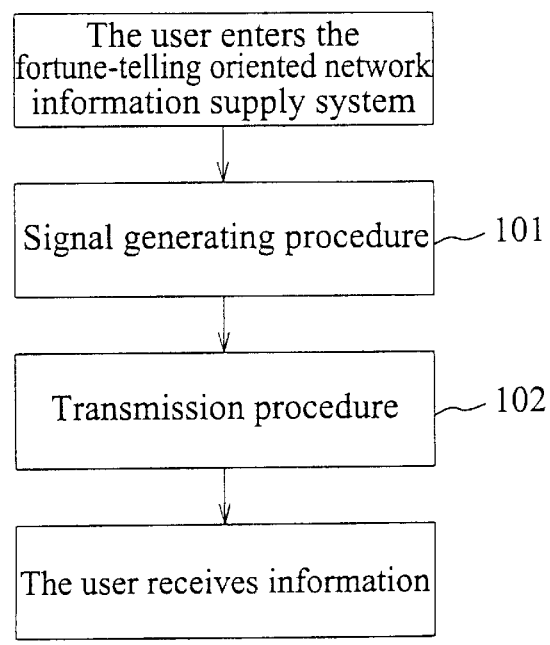
FIG. 6 is a flow chart showing a routine of the fortune-telling oriented network information supply method according to a preferred embodiment of the invention.

Referring to FIG. 6, when the user 30 logs onto the fortune-telling oriented network information supply system 10, the fortune-telling oriented network information supply method begins. In regards to this method, the fortune-telling oriented network information supply system 10 performs the request signal generating procedure 101 to generate a first or second request signal according to the contents of the basic user database, the contents of the user fortune record database 112 or the results of the fortune analysis program 121 previously obtained by the user 30. The system then performs the transmission procedure 102 to send the first or second signal to the information supply device which then sends out information accordingly in the form of texts, images or sounds to the user 30.

In particular, various first and second request signals can be generated at the same time and enter the transmission procedure 102 or they can be assigned a priority or permission to transmit in the request signal generating procedure 101. In other words, the user can simultaneously receive a variety of information, or just some of it, according to the settings. For example, if the user provides his basic data in the basic user database 111 and there is a fortune analysis record in the user fortune record database 112, then the first and second request signals can be simultaneously generated or be assigned a priority in the request signal generating procedure 101, (e.g., only the first or the second request signal is generated). Furthermore, the user can select the type or style of the information he wants to receive based upon which system sends the information. For instance, the user can decide that he does not want to receive advertisements. The system then only sends normal news to him.

In a preferred embodiment of the fortune-telling oriented network information supply system 10, the fortune analysis program 121 can combine the data in the basic user database 111, the data in the user fortune record database 112 and the results from the fortune analysis performed by the user 30 to determine what may interest the user 30. For example, even though similarly interested in knowing their fortunes regarding wealth, a housewife and a millionaire may make different requests. Thus, if the data in the basic user database 111 and the user fortune record database 112 are considered simultaneously, the system can more accurately determine what may interest the user 30.

Figure 7:
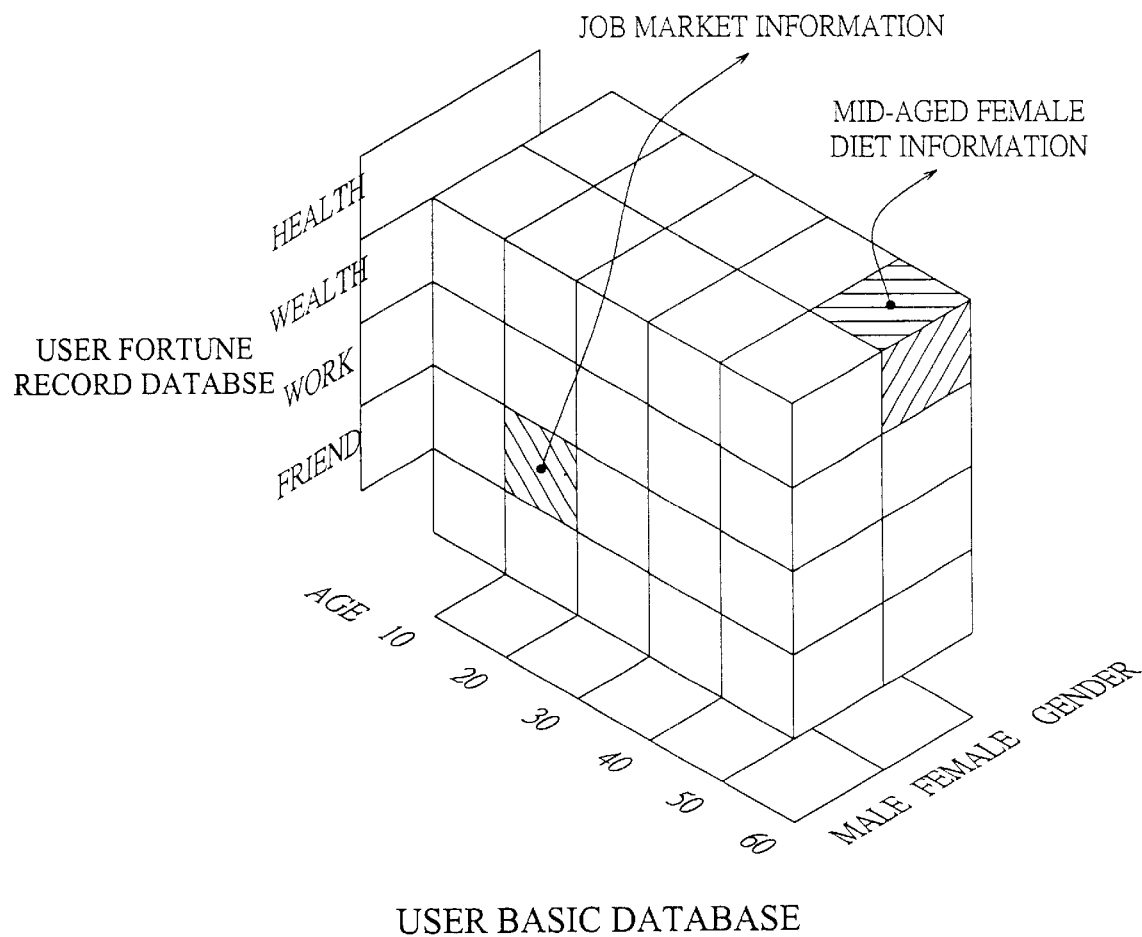
FIG. 7 is a schematic view showing, in a singular case, how to use the fortune-telling oriented network information supply method to determine what the user needs according to a preferred embodiment of the invention.

FIG. 7 shows a situation where the request signal generating procedure determines what the user is interested in according to the data entered in the basic user database 111 and the user fortune record database 112 by the user. If the user is registered as a 55-year-old female in the basic user database 111 and according to the record in the user fortune record database 112, the user had requested a health-related fortune-telling activity lately, then the user may be in need of health information related to the dietary requirements for a mid-aged women.

Since the user performs various fortune analyses on the fortune-telling oriented network information supply system, the basic data on the user should be more accurate than that registered on a normal system. Therefore, the system can more effectively send all sorts of information to the user based on this more accurate basic data. Even if the user does not register his own basic data, what he registers is more likely to be the basic data of his parents, spouse, friends or idols so the information provided may still be of use to the user. In other words, it does not matter whether the data provided by the user is his own; the analysis of interests by the fortune analysis program based upon the basic data is very likely to be related to what the user needs. For example, if the user is female, what she registers may not be her basic data but her boyfriend's. All she wants is to know is her boyfriend's personality using the astrology portion of the fortune analysis program. Thus, when the program provides information to the user according to her boyfriend's basic data, the user can use such information to find a subject her boyfriend may be interested in or to purchase a birthday gift for him. Such information is also useful to the user. This is very different from the usual case in which a user may register some data that is completely unrelated to him.

In addition, through the process of providing an analysis of the user's fortunes, the system can continuously obtain the most up to date information on the interests and needs of the user. Therefore, the fortune-telling oriented network information system and method disclosed herein can dynamically understand the user's needs and more accurately provide information to the right users. The user can obtain the information he wants through the fortune analysis activities without spending a lot of time modifying the registered information or searching the network for specific information. The information provider can more precisely understand an individual user's needs through the analysis of the fortune analysis server according to the fortune-telling oriented network information supply system and the method of the invention. The system can further send various information in real time to corresponding users without spending extra money and time doing market surveys or, as in the prior art, providing promotions to increase the click rate of the advertisements. This invention thus can more effectively facilitate information exchange and increase the efficiency thereof.

Although the invention has been described with reference to specific embodiments, this description should not be construed in a limiting sense. For example, the information supply device can first transmit information to the fortune-telling oriented network information supply system or other servers, and then to the user without sending information directly to the user. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A fortune-telling oriented network information supply system coupled to an information supply device for providing information to a user, which comprises:
    a database subsystem for storing relevant information for the user to perform fortune analysis activities; and
    a fortune analysis subsystem for the user to perform a fortune analysis therein;
    wherein the fortune analysis subsystem generates a first request signal according to the relevant information stored in the database subsystem, and the first request signal is transmitted to the information supply device which sends information to the user according to the first request signal.

2. The system according to claim 1, wherein the information relevant for the user to perform a fortune analysis comprises a basic user database which includes the basic data necessary for the user to perform a fortune analysis, and the fortune analysis subsystem which generates the first request signal according to the user basic database.

3. The system according to claim 1, wherein the information relevant for the user to perform fortune analysis comprises a user fortune record database which includes the process of the fortune analysis performed by the user, and the fortune analysis subsystem which generates the first request signal according to the user fortune record database.

4. The system according to claim 1, wherein the fortune analysis subsystem further uses the fortune analysis result performed by the user to generate a second request signal, which signal is transmitted to the information supply device so that the information supply device sends out information according to the second request signal to the user.

5. The system according to claim 1, wherein the information supply device comprises a server.

6. The system according to claim 1, wherein the information supply device comprises a disk drive.

7. The system according to claim 1, wherein the database subsystem comprises a server.

8. The system according to claim 1, wherein the database subsystem comprises a disk drive.

9. The system according to claim 1, wherein the database subsystem comprises random access memory (RAM).

10. The system according to claim 1, wherein the fortune analysis subsystem comprises a server.

11. A fortune-telling oriented network information supply method which uses a fortune analysis subsystem to generate a first request signal according to the relevant information provided by the user to perform fortune analysis and sends the first request signal to an information supply device which then sends out information according to the first request signal to the user.

12. A fortune-telling oriented network information supply method implemented in a fortune-telling oriented network information supply system for obtaining the user's information from an information supply device, wherein the fortune-telling oriented network information supply system comprises a database subsystem for storing the relevant information for the user to perform fortune analysis and a fortune analysis subsystem for the user to perform fortune analysis therein, the fortune-telling oriented network information supply method comprising the steps of:
    a request signal generating procedure, which generates a first request signal according to the relevant data for the user to perform a fortune analysis stored in the database using the fortune analysis subsystem; and
    a transmission procedure, which transmits the first request signal to the information supply device which then send out information according to the first request signal to the user.

13. The method according to claim 12, wherein
    the relevant information for the user to perform a fortune analysis comprises a user basic database containing the basic data needed for the user to perform a fortune analysis; and
    the fortune analysis subsystem which generates the first request signal according to the basic user database during the transmission procedure.

14. The method according to claim 12, wherein
    the relevant information for the user to perform a fortune analysis comprises a user fortune record database containing the process of the fortune analysis performed by the user; and
    the fortune analysis subsystem generates the first request signal according to the user fortune record database during the transmission procedure.

15. The method according to claim 12, wherein
    the request signal generating procedure further comprises the step of generating a second request signal according to the result of a fortune analysis using the fortune analysis subsystem; and
    the transmission procedure further comprises the step of sending the second request signal to the information supply device which then sends out information according to the second request signal to the user.

16. A recording medium storing a database and a fortune analysis program needed for a fortune-telling oriented network information supply method so as to provide a user information using an information supply device, which medium is characterized in that:
    the database comprises the data needed for the user to perform a fortune analysis; and
    the fortune analysis program generates a first request signal according to the data stored in the database, the first request signal is sent to the information supply device which then sends out information according to the first request signal to the user.

17. The recording medium according to claim 16, wherein
    the data for the user to run the fortune analysis program comprises a user basic database; and the fortune analysis program generates the first request signal according to the user basic database.

18. The recording medium according to claim 16, wherein the data for the user to run the fortune analysis program comprises a user fortune record database; and the fortune analysis program generates the first request signal according to the user fortune record database.

19. The recording medium according to claim 16, wherein the fortune analysis program further generates a second request signal according to the result of the fortune analysis program, the second request signal being sent to the information supply device which then sends out information according to the second request signal to the user.

* * * * *